Inventor
Jacob Zawels
By His attorneys
Howson and Howson

United States Patent Office 3,226,702
Patented Dec. 28, 1965

3,226,702
APPARATUS FOR DETERMINING THE POSITION OF AN ELECTRICALLY CONDUCTIVE WIRE IN THE PLANE OF ITS CATENARY
Jakob Zawels, Pretoria, Transvaal, Republic of South Africa, assignor to South African Iron and Steel Industrial Corporation, Limited, Pretoria, Transvaal, Republic of South Africa, a corporation of the Republic of South Africa
Filed Sept. 20, 1961, Ser. No. 139,522
Claims priority, application Republic of South Africa, Sept. 28, 1960, 3,979/60
1 Claim. (Cl. 340—196)

This invention relates to the determination of the position of electrically conductive elements, and has particular reference to the determination of the position of inter-stand metal loops in section rod or strip rolling mills.

In rolling mill terminology, the term "inter-stand loop" signifies a length of the material being rolled which is suspended between a pair of adjacent rolling stands.

As is well known, the size of the inter-stand loop in a rod or strip rolling mill is important in determining the speed of the mill since too large a loop may cause a cobble to arise, while a loop that is too small can result in excessive tension and hence deformation of the rolled product. It is, therefore, necessary to be able to determine the position of the loop.

Normally, inter-stand loop controllers and other position determining means are either of the photo-electric type which often requires considerable maintenance when used under rigorous conditions, or make use of mechanical contact which is cumbersome and results in wear when used in conjunction with a moving object, or are dependent on electrical capacitance measurement which is often unreliable due to the presence of extraneous metallic or other objects which effect capacitance.

It is accordingly an object of the present invention to minimize the above disadvantages.

According to the invention a method of determining the position of an electrically conductive element includes the steps of causing an electric current to flow along the element; and producing electro-magnetically a signal varying with the position of the element.

Preferably, the element forms part of a closed electrical loop; and the current is induced electro-magnetically in the loop.

According to another aspect of the invention, apparatus for determining the position of an electrically conductive element forming part of a closed electrical loop, includes, in combination, electromagnetic exciter means adapted to induce electric current in the loop; and electro-magnetic detector means adapted for association with the element to produce a signal when current flows along the element, the signal varying with the position of the element.

Preferred embodiments of the invention will now be described by way of example with reference to the accompanying drawings in which.

Figure 1:
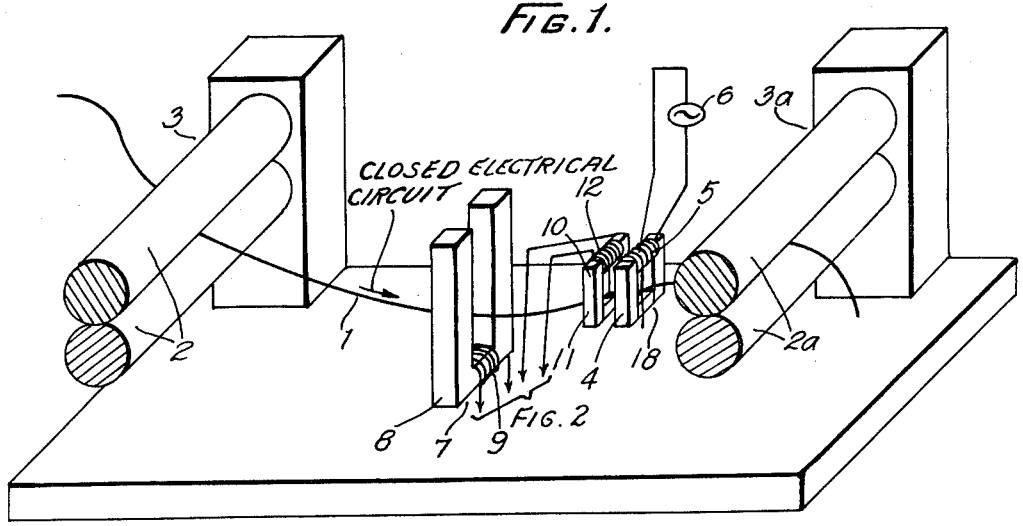
FIGURE 1 is a diagrammatic representation of portion of a rod mill with parts omitted for the sake of clarity, showing apparatus according to the invention.

Referring to FIGURE 1 of the drawings, rod 1 is suspended between rollers 2, 2a of adjacent mill stands 3, 3a and forms an inter-stand metal loop, the position of which is to be controlled. Rod 1 also forms part of a closed electrical loop which is completed through mill stands 3, 3a and earth.

Exciter 18 comprises closed magnetic core 4 surrounding rod 1, and coil 5 which is wound on a limb of core 4 and is connected to power source 6. Current flowing through coil 5 induces a current in the closed electrical loop. Because the core 4 is closed, the flux linkage between the coil 5 and rod 1 is independent of the position of rod 1.

Open cored unit 7 is located in the region in which the position of rod 1 is to be determined for control purposes. Unit 7 comprises open core 8 of magnetic material in the form of a U, and coil 9 around the connecting portion of the U. The current carrying rod 1 passes between the limbs of U-shaped core 8 and a voltage is induced in coil 9. The flux linkage between coil 9 and rod 1 varies with the position of rod 1, so that the magnitude of the induced voltage is dependent not only on the magnitude of the current flowing along rod 1, but also on the position of rod 1 relative to coil 9.

The magnitude of the voltage is very low for positions of rod 1 outside the U and is greater for positions within the U, increasing towards a maximum as rod 1 approaches the bottom of the U where the maximum flux linkage occurs between coil 9 and the closed electrical loop.

It will be appreciated that open cored unit 7 acts as a detector and a signal varying with the position of rod 1, can be extracted from coil 9. This signal can be utilized in any suitable manner. It may, for example, be utilized to actuate indicator means. Alternatively, it may be utilized to actuate control means for regulating the position of rod 1.

It is advantageous to use a U-shaped core 8 with parallel limbs, since the magnetic field is substantially uniform between such parallel limbs. This results in good linearity betwen the position of rod 1, and the output signal from coil 9. Also, the output signal is substantially independent of sideways or lateral play of rod 1.

It is, of course, possible to use an open magnetic core of any other suitable shape, but this will cause dependence on lateral movement. The limbs may, for example be convergent or divergent, or a horseshoe-shape may be provided.

It will be appreciated that excitation current may equally well be induced in the electrical loop by means of open cord unit 7 and a signal varying with the position of rod 1, extracted from coil 5 of unit 18. The current induced in the electrical loop will, in this case, vary with the position of rod 1.

Unit 7 with coil 9 on open core 8 of magnetic material, may be substituted by any other open cored coil adapted for the flux linkage between such coil and rod 1 when either one carries current, to vary with the position of rod 1, whether magnetic material is employed or not. It is, for example, envisaged that a self-supporting toroidal type of coil which has been opened out to U or horseshoe-shape, may be used. Such a coil will not have magnetic material in its core.

In addition to being dependent on the position of rod 1 relative to U-shaped core 8, a signal appearing across coil 5 or 9, as the case may be, will also be dependent on current changes in the loop as a result of effects such as variations in the power supply to the exciter coil, variations in the length of rod 1 betwen stands 3, 3a and the resistivity of rod 1 along its length. It will be appreciated that variations other than those due to a change of position of rod 1 will cause the signal to convey false information.

The problem of variations in power supply may be overcome by comparing the voltage developed across the detector coil with the voltage appearing across the exciter coil. This does not, however, compensate for variations in resistivity.

With the arrangement of the previous paragraph, difficulties may also arise as a result of phase differences between the voltages at the exciter and detector coils. Such phase differences may, however, be eliminated by rectifying the voltages for purposes of comparison.

According to a preferred embodiment of the invention, a reference unit 10 may be provided as shown in FIGURE 1. Reference unit 10 comprises the closed magnetic core 11 carrying coil 12. The electrical loop is excited by means of unit 18. A signal varying both with the position of rod 1 and the current flowing round the electrical loop, can be obtained from open cored unit 7. Because core 11 is closed, the flux linkage between coil 12 and rod 1 is independent of the position of rod 1. Therefore, reference unit 10 provides a signal which varies with the current flowing round the electrical loop but is substantially independent of the position of rod 1. By comparing the signals from open cored unit 7 and reference unit 10, a resultant signal can be obtained which is substantially independent of the current flowing round the loop, as long as current flows.

Figure 2:
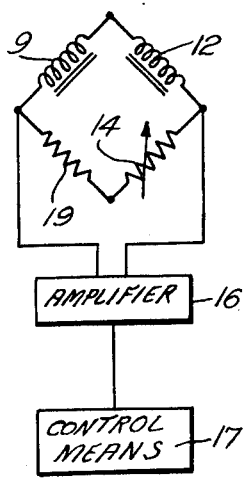
FIGURE 2 is a schematic diagram of a comparator circuit for the apparatus of FIGURE 1, in association with control means.

For purposes of comparison, coils 9 and 12 may be connected in the bridge circuit of FIGURE 2, which includes resistances 19, 14 and power source 15. The bridge is balanced to have zero output when rod 1 is in a predetermined position. Any deviation of rod 1 from this position will cause an unbalance of the bridge to produce an output.

It will be appreciated that variations of the loop current as a result of power supply or resistivity changes, will not upset the balance of the bridge and will have no effect on the output of the bridge.

Any output from the bridge is amplified in amplifier 16 and applied to control means 17, which may be of the feedback type. Control means 17 may regulate the speed of the rolling mill directly in any suitable manner. Alternatively, open cored unit 7 of FIGURE 1 may be mounted on a movable carriage (not shown), the output from the bridge causing control means 17 to adjust the position of open cored unit 7 in such a manner as to reduce the bridge output towards zero. The position of rod 1 is then adjusted in accordance with the movement of open cored unit 7 which is dependent on the position of rod 1.

Figure 3:
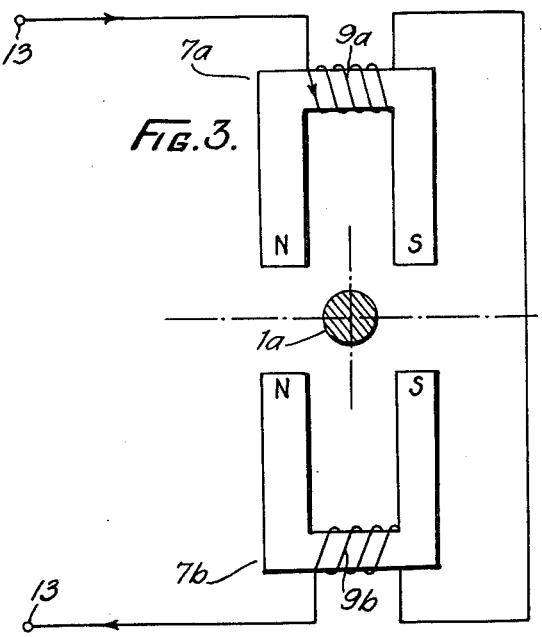
FIGURE 3 is a diagrammatic representation illustrating an alternative embodiment of the invention.

In the arrangement of FIGURE 3, a pair of units 7a, 7b with open magnetic cores 8a, 8b are provided with rod 1a located therebetween. Coils 9a, 9b are connected in series opposition. Current can be induced in rod 1a by means of an exciter unit similar to 18 of FIGURE 1. In each of coils 9a, 9b a signal will be produced which varies both with the position of rod 1a and with the current flowing along rod 1a. A resultant output signal can be obtained across terminals 13. When rod 1a is centrally disposed between units 7a, 7b, the output across terminals 13 will be zero. The output will vary from zero with a deviation of rod 1a from the central position.

Units 7a, 7b may be mounted for movement together, an output signal across terminals 13 being utilized to adjust the position of units 7a, 7b so as to reduce the output towards zero. The position of rod 1 is then adjusted in accordance with the movement of units 7a, 7b.

It is, of course, also possible to excite the system by means of open cored units 7a, 7b, in which case the current induced in the electrical loop will vary with the position of rod 1a. A detected signal which also varies with the position of rod 1a, can then be obtained by means of a unit such as 18 in FIGURE 1. The position of rod 1a can also be adjusted in accordance with the movement of units 7, 7b which reduces the detected signal towards zero.

Instead of using only a pair of units 7a, 7b, two or more suitably connected open cored units may be used.

A position determining system according to the invention is non-contacting, continuously indicating, very simple in operation, robust and requires little auxiliary equipment.

It will be appreciated that many variations in detail are possible without departing from the spirit of the invention. For example, magnetic material is not essential for the cores of the coils and at very high frequencies it may, in fact, be desirable not to use magnetic material.

Also, the invention is not limited in application to the positional control of inter-stand loops in rolling mills. It may be used for determining and/or controlling the positions of other elements, such as steel mine hoist ropes or tool posts on lathes. In the latter case, a closed electrical loop can be formed by the tool post, a tool, material being worked, and the lathe. It is also envisaged that in certain applications, current may be caused to flow along an element by means other than electro-magnetic induction.

What I claim is:

Apparatus for producing a signal to determine the position of an elongated, electrically conductive element which forms part of a closed electrically conductive loop and is movable relative to the remainder of the loop, comprising in combination an electromagnetic exciter including a coil with a closed core embracing the element to induce in the closed loop electric current flow which is substantially independent of the position of the element in relation to the exciter; and detector means including a coil having an open core embracing the element and flux linked to the element, the electromagnetic field of current flowing through said element inducing in the open-cored coil a current dependent on the position of the element, and said flux linkage of the element and detector varying substantially linearly with the position of the element with respect to the coil, a reference unit comprising a coil with a closed core embracing said element and flux linked with said element, the current in said element inducing in said reference coil a current substantially independent of the position of the element; and a comparator circuit connected to said reference coil and to said open-cored coil and producing a resultant signal according to the current in each coil, said resultant signal being substantially independent of the current flow along the element and varying substantially linearly with the position of the element.

References Cited by the Examiner
UNITED STATES PATENTS

| | | | |
|---|---|---|---|
| 1,586,962 | 6/1926 | Buckley | 324—34 |
| 2,032,176 | 2/1936 | Kovalsky. | |
| 2,068,116 | 1/1937 | Shotter | 340—196 |
| 2,193,189 | 3/1940 | Brooke et al. | 226—45 X |
| 2,661,009 | 12/1953 | Dunnegan et al. | 318—6 X |
| 2,677,100 | 4/1954 | Hayhurst | 324—34 X |
| 2,679,620 | 5/1954 | Berry | 340—196 |
| 2,742,099 | 4/1956 | Hagen | 340—195 |
| 2,842,039 | 7/1958 | Swingle | 340—196 |
| 3,156,989 | 11/1964 | Atkinson | 340—196 |

NEIL C. READ, *Primary Examiner.*

FREDERICK M. STRADER, *Examiner.*

THOMAS B. HABECKER, R. B. LAPIN,
*Assistant Examiners.*